UNITED STATES PATENT OFFICE.

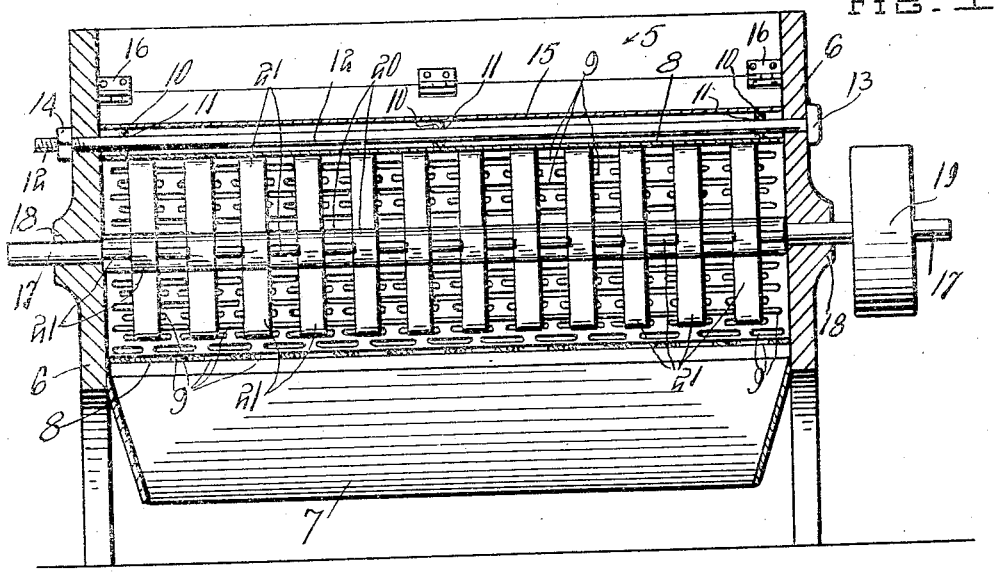
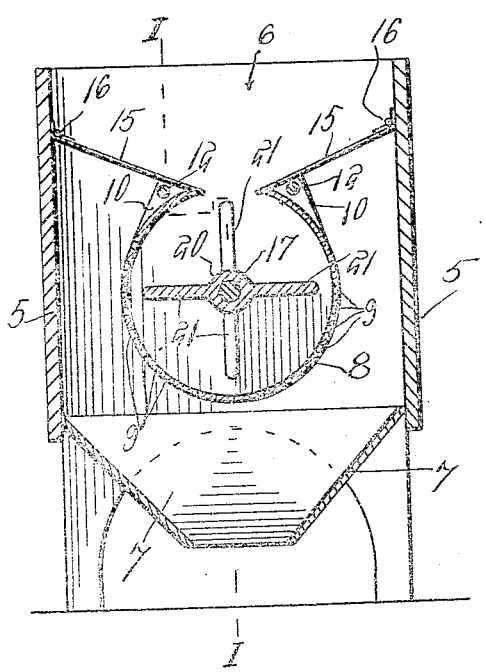
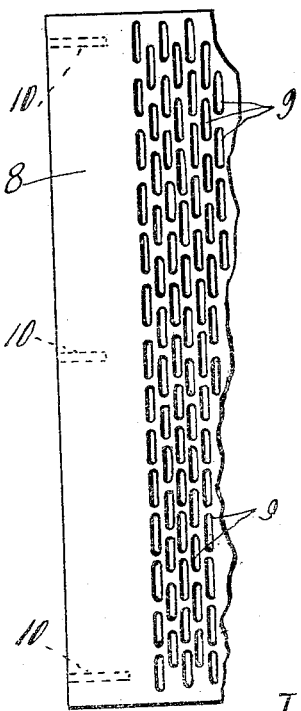

JOHN T. HUSTON, OF COLUMBUS, GEORGIA.

PEANUT-SHELLING MACHINE.

1,246,100.   Specification of Letters Patent.   Patented Nov. 13, 1917.

Application filed July 3, 1915, Serial No. 37,945. Renewed May 16, 1917. Serial No. 169,115.

*To all whom it may concern:*

Be it known that I, JOHN THOMAS HUSTON, a citizen of the United States, residing at Columbus, in the county of Muscogee, State of Georgia, have invented certain new and useful Improvements in Peanut-Shelling Machines; and I do hereby declare the following to be a full, clear, and exact description of the invention, such as will enable others skilled in the art to which it appertains to make and use the same.

This invention relates to new and useful improvements in peanut shelling machines, particularly of that type including a foraminous concave and a thresher member rotatable therein.

It is the object of the present invention to simplify the structure and improve the efficiency of machines of this character, and it is more specifically the object to provide a machine wherein the concave may be readily removed as desired to replace it with concaves adapted for shelling peanuts of various general sizes.

It is further an object to provide in a machine of the class described, a thresher member which possesses maximum efficiency in shelling the peanuts with a minimum breakage of the nuts.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:

Figure 1 is a central vertical longitudinal sectional view through the improved machine.

Fig. 2 is a transverse sectional view therethrough.

Fig. 3 is a fragmentary plan view of the concave member.

Referring now more particularly to the accompanying drawings, the preferred form of the machine is shown as comprising a housing or casing including the side and end walls 5 and 6, respectively, and the bottom which comprises inwardly inclined boards 7 forming a longitudinally extending discharge spout. The concave is formed of a single sheet 8 of flexible metal which is of a length substantially equal to the length of the casing and which is provided with a series of longitudinally elongated openings 9 arranged in staggered relation to form a foraminous body. This concave is detachably secured in the casing by brackets 10 secured at spaced intervals to its side edges and provided with openings 11 to receive rods 12 which extend longitudinally in parallel relation in the upper portion of the casing and which are secured by passing them through the end walls 6, each of these rods being preferably provided with a head 13 on one end, and having its other end threadingly receiving a nut 14 whereby they are secured. The rods are spaced apart a distance less than the diameter of the concave, and hold the concaved body in proper shape by reason of the resiliency of the said body. The hopper for feeding nuts into this concave is formed by a pair of plates 15 which have their outer sides hinged at 16 to the sides 5 of the casing adjacent their tops and which incline downwardly and rest on the brackets 10.

In practice, it is desirable to use various concaves having different sized openings for different sizes of nuts to be shelled, and these concaves are readily interchangeable in the machine, simply by lifting up the hopper plates, and withdrawing the rods 12.

The thresher member of the machine includes a shaft 17 which extends through the machine coincident with the axis of the concave and which is journaled in bearings 18 carried by the end wall 6 and extends outwardly thereof to carry a pulley 19 or other desired means for rotating it. A series of sleeves 20 are fixedly secured on the shaft within the concave and carried by each of these sleeves is a pair of thresher arms 21 which extend radially therefrom in opposite directions, and the arms of each alternate sleeve extends in parallel relation and at right angles to the next adjacent arm.

Thus a structure is provided which is efficient in action, and does not crush the nut kernels. The nuts or shells pass outwardly of the concave through the openings 9 and onto the bottom from whence they are discharged outwardly of the machine.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention as claimed.

What I claim is:—

A nut shelling machine, the combination with a casing, of a concave comprising a foraminous body, brackets on the side edges of said body, rods extending longitudinally through the casing in parallel relation to each other and detachably engaging said brackets to hold the concave in substantially cylindrical form, and a thresher member within the concave, and a hopper comprising a pair of plates having their outer side edges hinged to the upper side portions, of the casing, and their inner edges seating on the said brackets.

In testimony whereof, I affix my signature, in the presence of two witnesses.

JOHN T. HUSTON.

Witnesses:
W. H. THAMESE,
M. HOYS.